March 17, 1959

R. H. ARMACOST ET AL 2,877,674

HEAT DISSIPATING DRILL BUSHING

Filed Feb. 20, 1958

ROBERT H. ARMACOST,
DUDLEY L. ROBERTSON,
INVENTORS.

BY
Beehler & Shanahan
ATTORNEYS.

March 17, 1959 — R. H. ARMACOST ET AL — 2,877,674
HEAT DISSIPATING DRILL BUSHING
Filed Feb. 20, 1958 — 2 Sheets-Sheet 2
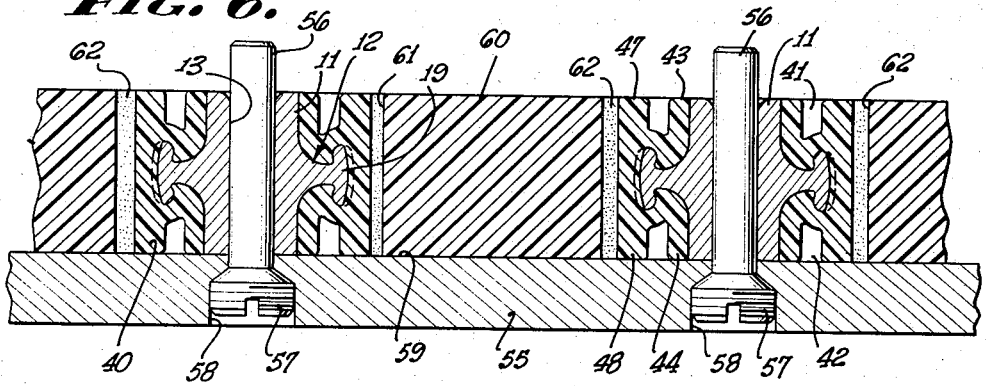
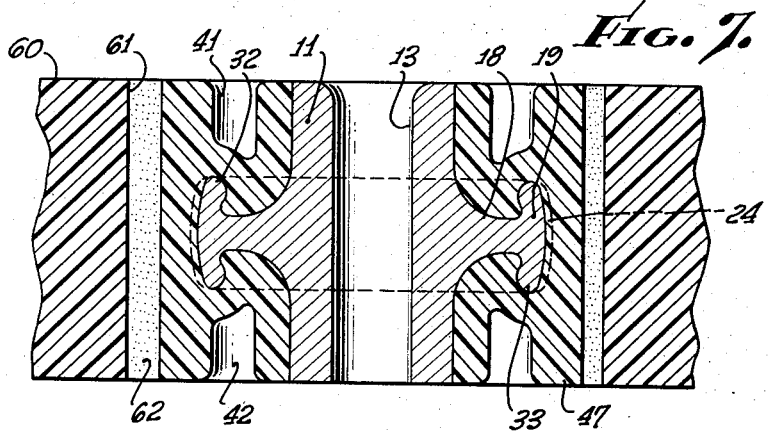
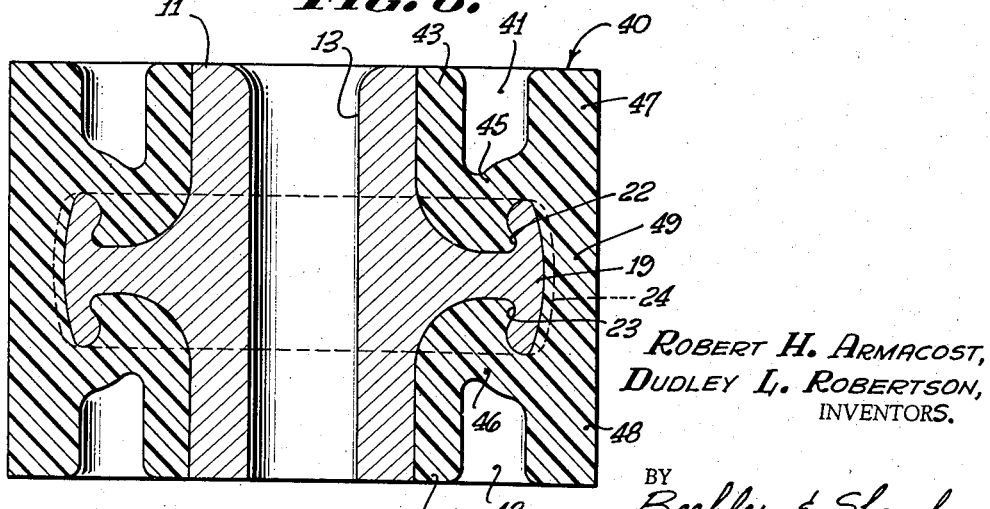
Robert H. Armacost,
Dudley L. Robertson,
INVENTORS.
BY Beehler & Shanahan
ATTORNEYS.

2,877,674
HEAT DISSIPATING DRILL BUSHING

Robert H. Armacost, Los Angeles, and Dudley L. Robertson, West Covina, Calif., assignors to American Drill Bushing Co., Los Angeles, Calif., a corporation of California Application February 20, 1958, Serial No. 716,308

4 Claims. (Cl. 77—62)

The invention relates to drill jigs and bushings and has special reference to a drill bushing of a type satisfactory for combination with a plastic setting under circumstances where the mounting will bear up under treatment such as might ordinarily loosen or destroy the average mounting of a drill bushing in that type of material.

In the past few years the industry has discovered and has made rather substantial use of plastic drill jigs and plastic drill jig mountings in the interest of providing inexpensive drill jigs particularly well adapted to complicated configurations. One of the important drawbacks in making use of plastic mountings has been the inability to assure proper retention and centering of the drill bushings where they might be abused during operation. One of the chief causes for the malfunctioning of plastic mounted drill bushings has been overheating which occurs, for example, when dull drill bits are used or perhaps when the drill bit is cocked at an angle and scrapes to an unnecessary degree against the inside walls of the drill bushing. Overheating, regardless of the cause, generally results in a softening of the plastic bond sufficient in any event to cause the drill bushing to become misaligned and which on some occasions is so great that the drill bushing becomes torn loose from its mounting. Even on those occasions where there may be only a slight softening followed by a rehardening of the plastic after the fixture has cooled, the rehardening more frequently than not sets the bushing in a new position which is misaligned.

Also on some occasions where the drill bushing is to be mounted in the first instance in a drill jig of plastic material by use of some cementitious packing or, on occasions, by use of plastic packing, difficulties arise in effectively holding the metallic drill bushing in a proper position while it is being secured in the plastic drill jig.

It is therefore among the objects of the invention to provide a new and improved drill jig which is especially efficacious for use in plastic mountings in that a particularly firm bond is made possible which is not easily disturbed when the jig bushing or fixture becomes overheated.

Another object of the invention is to provide a new and improved drill bushing of special configuration adapted to the more uniform dissipation of heat throughout the entire area of the mounting surfaces, thereby so distributing the temperature as to minimize likelihood of softening of a plastic bond between the bushing and a surrounding plastic mounting.

Still another object of the invention is to provide a new and improved drill bushing which includes a special flange enabling the bushing to be mounted by plastic means and in a plastic jig, if need be, the flange being so constructed as to carry heat away from the bushing a distance sufficient to dissipate a substantial amount of the heat.

Also included among the objects of the invention is to provide a new and improved heat dissipating drill bushing structure wherein the configurations are of such character as to be substantially uniform for virtually all sizes and diameters of bushings, thereby to materially minimize the inventory of bushings which are particularly well adapted for use with plastic mountings which might otherwise be disturbed as a result of overheating.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 6 is a longitudinal sectional view showing the technique employed for mounting drill bushings in a plastic drill block or jig.

Figure 7 is a longitudinal sectional view of a single drill bushing mounted in a plastic drill jig.

Figure 8 is a longitudinal sectional view of the drill bushing encased in a plastic jacket or button, thereby providing a heat dissipating drill bushing assembly ready for mounting in a drill jig.

Figure 1:
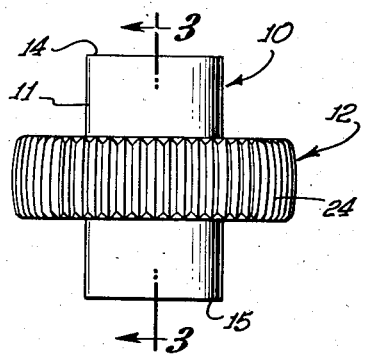
Figure 1 is a side elevational view of a heat dissipating drill bushing.
Figure 2:
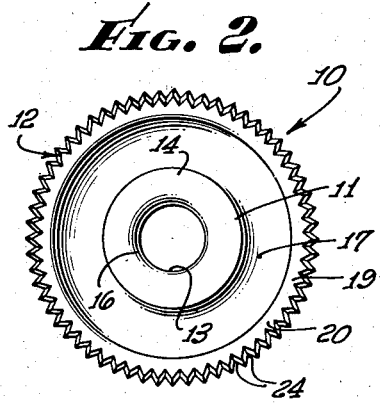
Figure 2 is a plan view.
Figure 3:
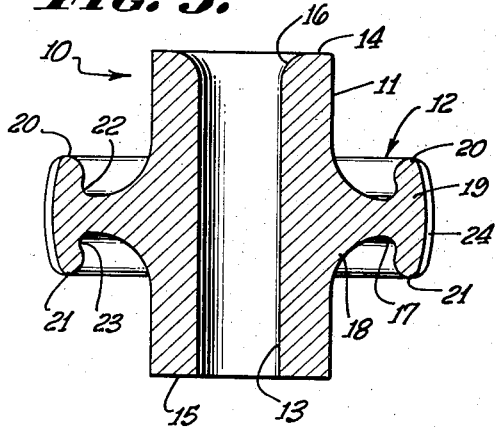
Figure 3 is a longitudinal sectional view of the bushing taken on the line 3—3 of Figure 1.

In an embodiment of the invention chosen for the purpose of illustration there is shown a drill bushing indicated generally by the reference character 10 and which comprises a body 11 and a flange 12. More particularly the body as shown to good advantage in Figure 3 is substantially cylindrical in shape and has a bore 13 extending centrally through the body between an inlet end 14 and an outlet end 15. At the inlet end the edge is chamfered at 16 to provide an approach for the bit when it is inserted into the bushing.

The flange 12 previously made reference to is somewhat T shaped in cross section, as shown in Figure 3, the cross-sectional shape being such that a leg 17 of the T spreads rapidly outwardly at the area of junction with the body 11 so that there is a wide enlargement or base portion 18 for the leg which covers a very substantial portion of the exterior diameter of the body.

The cross-bar 19 of the T section has a somewhat arcuate shape and terminates at the ends of the bar in what may be appropriately designated beads 20 and 21. It will be noted that the beads 20 and 21 are rounded and more particularly that they extend toward the body 11, thereby providing undercut portions 22 and 23.

The bar 19 at its entire outer perimeter is formed with a series of knurls 24 of such length and depth that the ridges and depressions of the knurls or knurled portions extend outwardly part way around the beads 20 and 21, as shown in Figure 3.

Figure 4:
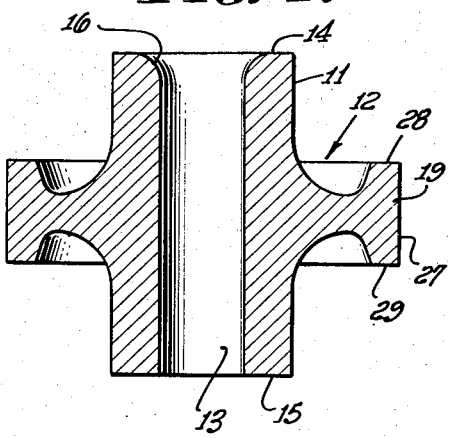
Figure 4 is a longitudinal sectional view somewhat resembling Figure 3 but showing the bushing in initial form prior to knurling.

As a means for effectively forming the flange 12 with its specifically defined shape and knurling the bushing initially is formed in the shape of Figure 4. As there shown the flange in cross section initially has in general a T shape but the bar 19 has a flat outer cylindrical surface 27 which terminates in flat ends 28 and 29 which do not as yet provide undercuts. With the form of flange just described as a blank, when the drill bushing is subjected to knurling by engagement with an appropriate knurling tool, the ridges and recesses previously described are formed and the pressure and working of the knurling operation forms the beads 20 and 21 previously referred to and impresses that part of the flange toward the body a distance sufficient to provide the undercut 22 and 23.

Figure 5:
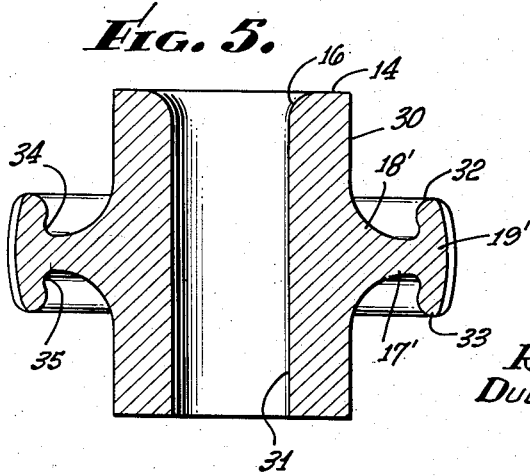
Figure 5 is a longitudinal sectional view similar to Figure 3 but for a drilling of larger size diameter.

As shown in Figure 5, when a drill bushing is made to accommodate a drill of larger diameter by use of a body 30 which has a larger outside diameter as well as employing a bore 31 of larger diameter, the flange section remains the same. In this drill bushing of larger size, a flange 19′, although having a greater perimeter and greater diameter, continues to employ substantially the same cross sectional shape and size as the flange 19 shown and described in connection with Figure 3. That is to say, a leg 17′ has the same shape and length and joins the mid-portion of the body by use of an enlargement 18′ which extends over a large portion of the outer perimeter of the body to the same general extent as the enlargement 18 in Figure 3. Similarly beads 32 and 33 are substantially the same cross-sectional shape and size and provide undercuts 34 and 35 of the same proportion as the undercuts 22 and 23. Here again as throughout those portions of the bushing forming the flange, the difference lies largely in the perimeter rather than in the cross-sectional shape.

A drill bushing formed as shown and described is especially effective in providing a heat-conducting path from the body of the bushing outwardly throughout a central area to the outermost perimeter of a flange whereby reason of the surface presented to the mounting as well as the shape and flowing characteristics of the section it effectively spreads heat by conduction from the body to the surrounding mounting. The flowing character evidenced in the cross-sectional shape of the flange contributes materially to the rapid flow of heat and the enlargement, spreading as it does throughout a substantial portion of the exterior of the body, facilitates picking up heat from the body and conducting it outwardly to the flange.

An effective employment of the drill bushing described herein features a plastic jacket 40 which entirely surrounds the exterior portions of the drill bushing. The plastic may be one of a number of commercially available types of synthetic plastic resinous materials of which phenol-formaldehyde and urea-formaldehyde are typical. Sundry other phenolic resins, alkyd resins, and other appropriate synthetic plastics capable of solidifying to a relatively hard degree may be employed, especially those compounded to exhibit a relatively high coefficient of heat conduction.

When the synthetic plastic material is applied, a sufficient quantity is employed to completely encase the exterior surface of the body 11 and all portions of the flange 12. During the application annular depressions 41 and 42 are formed either during the molding or by subsequent removal of material in that area. The important factor accomplished by providing the annular depressions is to give to the plastic jacket a substantially uniform section or depth through all portions.

As clearly shown in Figure 8, the plastic jacket or button, if that term be employed, after application to the bushing has inner flanges 43 and 44 which are substantially uniform in thickness throughout their entire length. Intermediate portions 45 and 46 are of comparable thickness except for the areas immediately adjacent the undercuts 22 and 23 which, as a practical matter, are slightly thicker. Outer flanges 47 and 48 are likewise of substantially uniform thickness throughout their length and the thickness is in the same general category as the thickness of the flanges 43 and 44. A portion 49 of the jacket overlying the bar 19 of the flange as viewed in cross section is also of substantially the same thickness. Though it is appreciated that the precise thickness may not be critical, it is advisable that the thickness of the jacket be rather generally uniform and not massive so that as heat generated in the body 11 is conducted outwardly through the flange to the outermost portions of the flange, the flange as well as the body will heat up to comparable temperatures materially less than would be present if the heat were not spread over the large available area. Therefore, although temperatures in the neighborhood of 500 degrees might initially be generated on the interior surface of the bore 13, temperatures on the exterior surface of the body will be materially less due to the rapid outflow of heat toward and through the flange. Temperatures around the beads of the flange and around the bar 19 will be at a minimum and so little above the 100 degree Farenheit temperature range as to leave the surrounding plastic jacket unsoftened and undisturbed.

Because of the undercut character of the flange and the large area of both sides of the flange section, as well as due to the presence of the knurled exterior, the flange and especially the bar portion thereof will continue to provide a very secure and immovable hold upon the material of the plastic jacket even though under exceptional circumstances temperature in the body, and even near the ends of the body, might reach a range where some softening might take place.

By initially providing a jacket for the bushing, these proportions and relationships herein defined as preferable can be established and maintained under careful supervision and control and consequently not left to the hazards of installations made where such control is not possible.

To understand and appreciate the advantages of the drill bushing herein defined, attention is directed to the manner of mounting and forming drill jigs or drill blocks by use of the particular bushing involved. For such purpose a master plate 55 is employed which will be a plate simulating the shape and configuration of the work upon which an operation will ultimately be performed. Pins 56 are mounted in the plate, these pins being of the same precise diameter as the drill which will ultimately be used. Threaded ends 57 on the pins for convenience may be threaded into holes 58 which are similarly threaded on their interior.

When the drill bushing is supplied with a jacket already in place upon it, as shown in Figure 8, the drill bushing and its jacket are inserted over the appropriate pin 56 in each instance and permitted to rest upon an upper surface 59 of the master plate 55. A drill block 60 of some one of the acceptable plastic materials is previously prepared by having apertures 61 drilled therein, oversize with respect to the outermost circumference of the jacket. These apertures may be in the neighborhood of one-eighth to one-quarter inch larger, depending upon the size of drill bushing employed and other factors involved in the mounting such as curvature or contour of the plate where plates other than flat plates are needed.

The drill block is then placed upon the master plate with drill bushings and their jackets fitting within the apertures 61. Although there may be some misalignment with respect to the center to center location of drill bushings and their mounting pins within the apertures 61, the misalignment is not material provided it remains within the limits suggested.

With the drill bushings firmly held by the pins, a matrix 62 is poured into the apertures and around the exterior of the jacket and permitted to harden. Once hardened to a sufficient extent, the plate and pins 56 are withdrawn and the drill block complete with drill bushings is ready for service as a drill jig.

When rotating drills are extended into the bores 13 of the drill bushings, should the drills be dull or, especially when hand operated, be tilted at a slight angle causing frictional engagement of the drill with the interior of the bore, the drill bushing may become heated. Heating caused by the practice mentioned might be high enough so that under ordinary circumstances it would entirely destroy the bond between the drill bushing and its mounting. In the mounting herein disclosed and claimed, however, heat generated in the body after being transferred outwardly to the flange as previously described, passes into the surrounding jacket and from there is dissipated to the atmosphere either within the annular depressions 41 and 42, at the outer ends of the flanges 43, 44, 47, 48, or laterally outwardly through the matrix and thence into the drill block. The amount of area provided on the exterior of the jacket as well as on the exterior of the drill bushing itself is relatively large and accordingly facilitates the dispersion of heat generated within the drill bushing.

There has accordingly been described herein a drill bushing of special construction particularly well adapted to conducting heat away from the interior of the bushing. There has also been described in connection herewith an effective means of conducting heat away from the exterior of the outermost portion of a heat dissipating flange through an appropriate jacket in a path particularly well adapted to the general dispersion and dissipation of the heat, thereby making it possible to hold temperatures low enough between the bushing and the jacket so that the bond is not disturbed. As a consequence, plastic or molded drill blocks can continue to be employed for use with drill bushings on work where a high degree of precision is required and where continued performance of the same drill jig is needed in the operation over long periods of time. The combination is therefore effective and substantially minimizes the cost of precision drill jigs without it being necessary to sacrifice to any degree the high precision requirements.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A heat dissipating drill bushing for use in a molded plastic mounting comprising a substantially cylindrical body having a drill hole extending axially therethrough, a flange on the exterior of the body substantially midway between opposite ends and extending outwardly of the exterior of said body, said flange having a generally T shape in cross section, the cross-bar of said T shape providing an overlying annular portion on both sides of the flange spaced from said body, said flange having a roughened texture throughout the outer perimeter.

2. A heat dissipating drill bushing for use in a molded plastic mounting comprising a substantially cylindrical body having a drill hole extending axially therethrough, a flange on the exterior of the body substantially midway between opposite ends and extending outwardly of the exterior of said body, said flange having a generally T shape in cross section with the base of the leg having a progressively expanding shape on both sides at the area of junction with the body, the cross-bar of said T shape being outwardly convex and having beads at the ends providing an overlying annular portion on both sides of the flange spaced from said body, said flange having a roughened texture throughout the outer perimeter.

3. A heat dissipating drill bushing for use in a molded plastic mounting comprising a substantially cylindrical body having a drill hole extending axially therethrough, a flange on the exterior of the body substantially midway between opposite ends and extending outwardly of the exterior of said body, said flange having a generally T shape in cross section, the cross-bar of said T shape having beaded ends providing an overlying annular portion on both sides of the flange spaced from said body, a relatively deep knurling extending throughout the circumference of the flange and into the beaded ends throughout the perimeter of the flange, said flange having a roughened texture throughout the outer perimeter.

4. A heat dissipating drill bushing for use in a molded plastic mounting comprising a substantially cylindrical body having a drill hole extending axially therethrough, a flange on the exterior of the body substantially midway between opposite ends and extending outwardly of the exterior of said body, said flange having a generally T shape in cross section with the base of the leg having a progressively expanding shape on both sides at the area of junction with the body, the cross-bar of said T shape being outwardly convex and having beads at the ends providing an overlying annular portion on both sides of the flange spaced from said body, and a relatively deep knurling extending throughout the circumference of the flange and into the beads throughout the perimeter of the flange.

References Cited in the file of this patent

UNITED STATES PATENTS

| | | |
|---|---|---|
| 2,698,547 | Armacost | Jan. 4, 1955 |
| 2,728,249 | Stein et al. | Dec. 27, 1955 |